(12) United States Patent
Berg et al.

(10) Patent No.: US 9,015,593 B2
(45) Date of Patent: Apr. 21, 2015

(54) MANAGING ADVISORIES FOR COMPLEX MODEL NODES IN A GRAPHICAL MODELING APPLICATION

(75) Inventors: Daniel C. Berg, Holly Springs, NC (US); Brad L. Blancett, Raleigh, NC (US); Michael D. Elder, Durham, NC (US); Chad M. Holliday, Holly Springs, NC (US); Alexander V. Konstantinou, New York, NY (US); Narinder Makin, Morrisville, NC (US); Timothy A. Pouyer, Greenville, SC (US); John E. Swanke, Terryville, CT (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 12/325,664

(22) Filed: Dec. 1, 2008

(65) Prior Publication Data

US 2010/0138795 A1  Jun. 3, 2010

(51) Int. Cl.
*G06F 3/048* (2013.01)
*G06F 9/44* (2006.01)
*H04L 29/08* (2006.01)
*H04L 12/24* (2006.01)

(52) U.S. Cl.
CPC .............. *G06F 8/34* (2013.01); *H04L 29/0899* (2013.01); *H04L 41/12* (2013.01); *G06F 3/048* (2013.01)

(58) Field of Classification Search
CPC ................ G06F 3/048; H04L 41/0213; H04L 29/08073; H04L 29/06; H04L 41/12; H04L 29/0899

USPC ................... 715/853, 734–736; 709/223–224
See application file for complete search history.

(56) References Cited

U.S. PATENT DOCUMENTS

| | | | |
|---|---|---|---|
| 5,295,244 A * | 3/1994 | Dev et al. | 715/853 |
| 5,970,490 A | 10/1999 | Morgenstern | |
| 6,256,773 B1 * | 7/2001 | Bowman-Amuah | 717/121 |
| 6,271,845 B1 * | 8/2001 | Richardson | 715/764 |
| 6,629,065 B1 | 9/2003 | Gadh et al. | |

(Continued)

OTHER PUBLICATIONS

Arnold, W., et al., "Pattern Based SOA Deployment," Proc. of 5th Int'l Conf. on Service-Oriented Computing (ICSOC 2007), Sep. 17-20, 2007, Lecture Notes in Computer Science (LNCS), vol. 4749, Springer 2007.

(Continued)

*Primary Examiner* — Anil Bhargava
(74) *Attorney, Agent, or Firm* — Patents on Demand P.A.; Brian K. Buchheit; Scott M. Garrett

(57) ABSTRACT

A system for managing advisories for complex model nodes that can include a complex model, a graphical modeling application, and an advisory manager. The complex model can be configured to graphically represent a user-defined system as multiple nodes and relationships. The graphical modeling application can be configured to execute operations upon the complex model. The graphical modeling application can store data defining the graphical characteristics of the complex model as a notation model and data defining the semantic characteristics of the complex model as a semantic model. The notation model and the semantic model can be stored as separate data entities. The advisory manager can be configured to aggregate notifications and potential resolutions for the nodes of the complex model. The notifications and potential resolutions can be visually presented within the graphical modeling application.

20 Claims, 3 Drawing Sheets

(56) References Cited

U.S. PATENT DOCUMENTS

| | | | |
|---|---|---|---|
| 6,701,514 B1* | 3/2004 | Haswell et al. | 717/115 |
| 6,789,054 B1 | 9/2004 | Makhlouf | |
| 6,795,089 B2* | 9/2004 | Rajarajan et al. | 345/629 |
| 7,050,872 B2 | 5/2006 | Matheson | |
| 7,069,541 B2 | 6/2006 | Dougherty et al. | |
| 7,069,553 B2 | 6/2006 | Narayanaswamy et al. | |
| 7,134,122 B1 | 11/2006 | Sero et al. | |
| 7,196,712 B2* | 3/2007 | Rajarajan et al. | 345/619 |
| 7,320,120 B2* | 1/2008 | Rajarajan et al. | 717/104 |
| 7,370,315 B1* | 5/2008 | Lovell et al. | 717/100 |
| 7,463,263 B2* | 12/2008 | Gilboa | 345/440 |
| 7,568,019 B1* | 7/2009 | Bhargava et al. | 709/223 |
| 7,630,877 B2* | 12/2009 | Brown et al. | 703/21 |
| 7,643,597 B2 | 1/2010 | Liu et al. | |
| 7,665,085 B2 | 2/2010 | Sundararajan et al. | |
| 7,669,137 B2* | 2/2010 | Chafe et al. | 715/763 |
| 7,735,062 B2* | 6/2010 | de Seabra e Melo et al. | 717/120 |
| 2002/0120784 A1* | 8/2002 | Rajarajan et al. | 709/310 |
| 2003/0033402 A1* | 2/2003 | Battat et al. | 709/224 |
| 2003/0163450 A1 | 8/2003 | Borenstein et al. | |
| 2004/0179011 A1 | 9/2004 | Marshall | |
| 2006/0066627 A1 | 3/2006 | Gerhard et al. | |
| 2006/0101091 A1* | 5/2006 | Carbajales et al. | 707/202 |
| 2006/0101445 A1* | 5/2006 | Carbajales et al. | 717/165 |
| 2006/0161615 A1* | 7/2006 | Brooks et al. | 709/201 |
| 2006/0271341 A1* | 11/2006 | Brown et al. | 703/1 |
| 2006/0271909 A1* | 11/2006 | Huang et al. | 717/105 |
| 2007/0033273 A1* | 2/2007 | White et al. | 709/223 |
| 2007/0074203 A1 | 3/2007 | Curtis et al. | |
| 2007/0179823 A1* | 8/2007 | Bhaskaran et al. | 705/7 |
| 2007/0277151 A1* | 11/2007 | Brunel et al. | 717/113 |
| 2007/0288885 A1* | 12/2007 | Brunel et al. | 717/104 |
| 2008/0059945 A1* | 3/2008 | Sauer et al. | 717/105 |
| 2008/0127049 A1* | 5/2008 | Elaasar | 717/104 |
| 2008/0183725 A1* | 7/2008 | Blakeley et al. | 707/100 |
| 2008/0313008 A1* | 12/2008 | Lee et al. | 705/10 |
| 2008/0313595 A1* | 12/2008 | Boulineau et al. | 717/101 |
| 2008/0313596 A1* | 12/2008 | Kreamer et al. | 717/101 |
| 2009/0007062 A1* | 1/2009 | Gilboa | 717/105 |
| 2009/0012842 A1 | 1/2009 | Srinivasan et al. | |
| 2009/0044170 A1 | 2/2009 | Bernardi et al. | |
| 2009/0077621 A1* | 3/2009 | Lang et al. | 726/1 |
| 2009/0132562 A1* | 5/2009 | Mehr et al. | 707/100 |
| 2009/0171993 A1* | 7/2009 | Arthursson | 707/100 |
| 2009/0249281 A1* | 10/2009 | Fritzsche et al. | 717/104 |
| 2009/0278847 A1 | 11/2009 | Berg et al. | |
| 2009/0319239 A1 | 12/2009 | Arnold et al. | |
| 2009/0319467 A1 | 12/2009 | Berg et al. | |
| 2010/0030893 A1 | 2/2010 | Berg et al. | |
| 2010/0031247 A1 | 2/2010 | Berg et al. | |
| 2010/0058331 A1 | 3/2010 | Berg et al. | |
| 2010/0077328 A1 | 3/2010 | Berg et al. | |
| 2010/0083212 A1* | 4/2010 | Fritzsche et al. | 717/104 |
| 2010/0106933 A1* | 4/2010 | Kamila et al. | 711/171 |

OTHER PUBLICATIONS

Eilam, T, et al., "Reducing the Complexity of Application Deployment in Large Data Centers," Proc. of 9th IFIP/IEEE Int'l Sym. on Integrated Network Management (IM 2005), pp. 221-234, May 15-19, 2005.

Corneil, D., et al., "An Efficient Algorithm for Graph Isomorphism," Journal of the ACM, vol. 17, pp. 51-64, Jan. 1970.

Ullman, J., "An Algorithm for Subgraph Isomorphism," Journal of the ACM, vol. 23, pp. 31-42, Jan. 1976.

Gati, G., "Further Annotated Bibliography on the Isomorphism Disease," Journal of Graph Theory,1979; pp. 96-109; vol. 3, pp. 96-109, 1979.

Messmer, B.T., "Efficient Graph Matching Algorithms," University of Bern, PhD thesis, Switzerland, Nov. 1995.

Tsai, W., et al., "Error-correcting Isomorphisms of Attributed Relational Graphs for Pattern Analysis," IEEE Transactions on Systems, Man, and Cybernetics, vol. SMC-9, No. 12, pp. 757-768, Dec. 1979.

* cited by examiner

MANAGING ADVISORIES FOR COMPLEX MODEL NODES IN A GRAPHICAL MODELING APPLICATION

BACKGROUND

The present invention relates to the field of graphical modeling and, more particularly, to managing advisories for complex model nodes in a graphical modeling application.

Graphical modeling applications are effective productivity tools for system design tasks. The graphical modeling application allows for pieces of the system, called nodes, to be graphically represented and related to other nodes of the system. Additional data regarding the requirements and capabilities of a node are also entered into the graphical modeling application to further define the node as well as the type of relationship that the node has to other nodes.

A key function provided by conventional graphical modeling applications is the capability to aggregate all the advisories that affect a particular node. For example, the advisories displayed for a network server can include specific notifications of its subordinate components. This aggregation of advisory information provides a user with an efficient means to access this information and examine the impact of various related requirements and capabilities.

This functionality is possible because conventional graphical modeling applications store the created model as a single entity. That is, the user-entered data defining the graphics and semantics of the model are stored together as one model. Thus, this key functionality is lacking in graphical modeling applications that store graphical and semantic data for a model separately. For example, when a model is created within an ECLIPSE-based modeling application, the graphics used in the model are stored as notation model and the semantic data and relationships are stored as a semantic model. As such, the approaches utilized by conventional graphical modeling applications are not applicable to ECLIPSE-based graphical modeling applications.

BRIEF SUMMARY

One aspect of the present disclosure can include a system for managing advisories for complex model nodes. Such a system can include a complex model, a graphical modeling application, and an advisory manager. The complex model can be configured to graphically represent a user-defined system as multiple nodes and relationships. The graphical modeling application can be configured to execute operations upon the complex model. The graphical modeling application can store data defining the graphical characteristics of the complex model as a notation model and data defining the semantic characteristics of the complex model as a semantic model. The notation model and the semantic model can be stored as separate data entities. The advisory manager can be configured to aggregate notifications and potential resolutions for the nodes of the complex model. The notifications and potential resolutions can be visually presented within the graphical modeling application.

Another aspect of the present disclosure can include a method for managing advisories for complex model nodes. Such a method can determine related nodes for a node of a complex model. The relationship to the related node can be captured in a notation model and a semantic model associated with the complex model. The complex model can be presented within a graphical modeling application. An aggregate of notifications for the node can be created from notifications of the related nodes. The notifications can be generated by the graphical modeling application. In response to a user-selected command, the aggregate of notifications for the node can be presented in a distinct viewing area within the graphical user interface of the graphical modeling application.

Yet another aspect of the present disclosure can include a computer program product for managing advisories for complex model nodes. The computer program product can include a computer readable storage medium having embedded computer usable program code. The computer usable program code can be configured to determine related nodes for a node of a complex model. Relationships to related nodes can be captured in a notation model and a semantic model associated with the complex model. The complex model can be presented within a graphical modeling application. The computer usable program code can be configured to create an aggregate of notifications for the node from notifications of the related nodes. The notifications can be generated by the graphical modeling application. The computer usable program code can be configured to present the aggregate of notifications for the node in a distinct viewing area within a graphical user interface of the graphical modeling application in response to a user-selected command.

DETAILED DESCRIPTION

Figure 1:
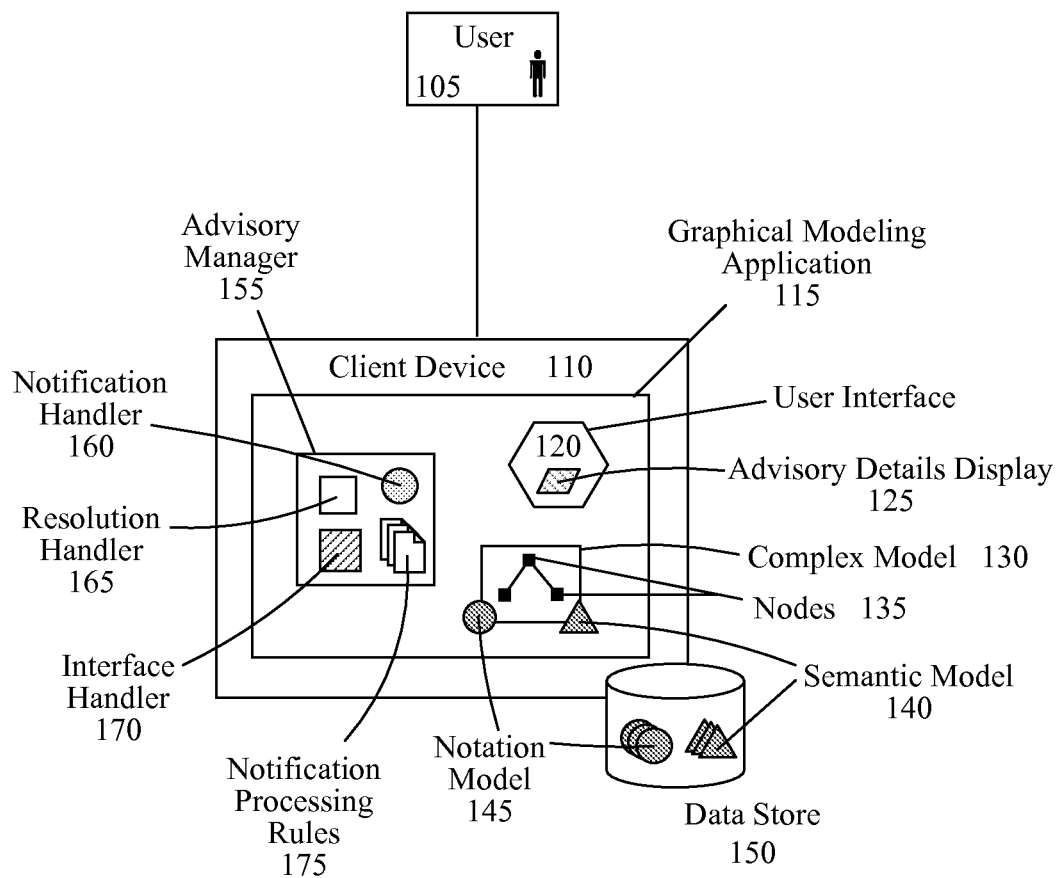
FIG. 1 is a schematic diagram illustrating a system that aggregates and presents notifications for the nodes of a complex model within a graphical modeling application in accordance with embodiments of the inventive arrangements disclosed herein.

The present disclosure details a solution for managing advisories for complex model nodes within a graphical modeling application. The data of the complex model can be stored by the graphical modeling application as two distinct entities—a notation model and a semantic model, which is an arrangement used for an ECLIPSE-based graphical modeling application, for example. The notation model can store data pertaining to the graphical characteristics of the complex model and the semantic model can store the related semantic data. An advisory manager can correlate the data of both the notation and semantic models in order to aggregate the notifications generated by the graphical modeling application for each node in the complex model. The aggregated notifications can then be visually presented within the graphical modeling application.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that aggregates and presents notifications for the nodes 135 of a complex model 130 within a graphical modeling application 115 in accordance with embodiments of the inventive arrangements disclosed herein. In system 100, a user 105 can view notifications aggregated by an advisory manager 155 within the user interface 120 of a graphical modeling application 115 operating on a client device 110. In one embodiment, the application 115 can be an ECLIPSE-based graphical modeling application or any other modeling application that represents a complex model as a notational model and a semantic model, which are digitally encoded in a storage medium a manner distinct from each another.

The client device 110 can represent a variety of electronic computing devices capable of running the graphical modeling application 115. The graphical modeling application 115 can represent a software application capable of performing a variety of functions for the creation/modification of a complex model 130. In an ECLIPSE embodiment, for example, the graphical modeling application 115 can utilize the ECLIPSE Modeling Framework (EMF) and/or the Graphical Editing Framework (GEF).

As used herein, the term "complex model" is used to describe a model consisting of multiple data models. That is, the unified display of the complex model 130 within the graphical modeling application 115 is produced through the correlation of the notation model 145 and semantic model 140.

The complex model 130 can consist of multiple related nodes 135. Data pertaining to the graphical representation of the nodes 135 can be stored in a data store 150 by the graphical modeling application 115 as a notation model 145, such as the shape of the nodes and the edges or lines that connect them. Semantic data, such as capability and requirements parameters, entered by the user 105 to define nodes 135 and their relationships can be stored as a semantic model 140 within the data store 150.

It is important to note that a node 135 of the complex model 130 can contain or relate to another complex model 130. Therefore, by extension, a complex model 130 can consist of multiple notation models 145 and/or semantic models 140.

The graphical modeling application 115 can include a user interface 120 and an advisory manager 155. The advisory manager 155 can represent a software component of the graphical modeling application 115 configured to handle presentation of various advisories, such as notifications and resolutions, that pertain to a user-specified node 135 within an advisory details display 125.

The advisory manager 155 can include a notification handler 160, a resolution handler 165, an interface handler 170, and notification processing rules 175. The notification handler 160 can represent the component of the advisory manager 155 configured to aggregate notifications generated by the graphical modeling application 115 for each node 135 of the complex model 130.

A notification can represent an item of data indicating a problem or potential problem with the complex model 130 in its current state that can be identified by the graphical modeling application 115 based on an analysis of the complex model 130. Examples of notifications can include, but are not limited to, a warning, an unsatisfied requirement or capability, an unsatisfied optional requirement or capability, an incompatibility notice, and the like.

It should be noted that the types of notifications handled by the notification handler 160 may be dependent on those supported by the graphical modeling application 115. That is, the notification handler 160 may be able to only aggregate the types of notifications that are generated by the specific graphical modeling application 115.

Aggregation of notifications by the notification handler 160 can be influenced by a set of notification processing rules 175. The notification processing rules 175 can represent guidelines by which the notification handler 160 determines which notifications from related nodes 135 to include for the present node 135 and if any characteristics of the notification require adjustment. The notification processing rules 175 can also include user-configurable parameters and/or user-defined rules.

For example, a notification processing rule 175 can dictate that an unsatisfied optional requirement from a subordinate node 135 should not be included in the aggregate of notifications for its superior node 135.

Once the notifications for a node 135 have been aggregated, the resolution handler 165 can determine a set of potential resolutions for the notifications. Potential resolutions identified by the resolution handler 165 can be generated by an internal algorithm or provided by a comparable component of the graphical modeling application 115.

It is important to note that the set of potential resolutions determined by the resolution handler 165 encompasses resolutions for the aggregate of notifications for the node 135. That is, the set of potential resolutions can include resolutions that address notifications for related nodes 135 that affect the present node 135.

Communications between the advisory manager 155 and the graphical modeling application 115 can be overseen by the interface handler 170. The interface handler 170 can be configured to utilize standardized communication protocols and/or application programming interface (API) commands to manage the data exchanges necessary for the function of the notification handler 160 and/or resolution handler 165.

The interface handler 170 can be responsible for presenting the advisory details display 125 within the user interface 120 of the graphical modeling application 115 in response to a user-selected command. The advisory details display 125 can represent a distinct viewing area of the user interface 120 in which the aggregated notifications and set of potential resolutions can be presented for a user-selected node 135.

In an alternate embodiment, the advisory manager 155 can be a separate software component capable of interacting with the graphical modeling application 115 to perform the previously-described functionality. For example, in an ECLIPSE-based embodiment, the advisory manager 155 can be an ECLIPSE plug-in designed to provide advisory management to an existing ECLIPSE-based graphical modeling application.

As used herein, presented data store 150 can be a physical or virtual storage space configured to store digital information. Data store 150 can be physically implemented within any type of hardware including, but not limited to, a magnetic disk, an optical disk, a semiconductor memory, a digitally encoded plastic memory, a holographic memory, or any other recording medium. Data store 150 can be a stand-alone storage unit as well as a storage unit formed from a plurality of physical devices. Additionally, information can be stored within data store 150 in a variety of manners. For example, information can be stored within a database structure or can be stored within one or more files of a file storage system, where each file may or may not be indexed for information searching purposes. Further, data store 150 can utilize one or more encryption mechanisms to protect stored information from unauthorized access.

Figure 2:
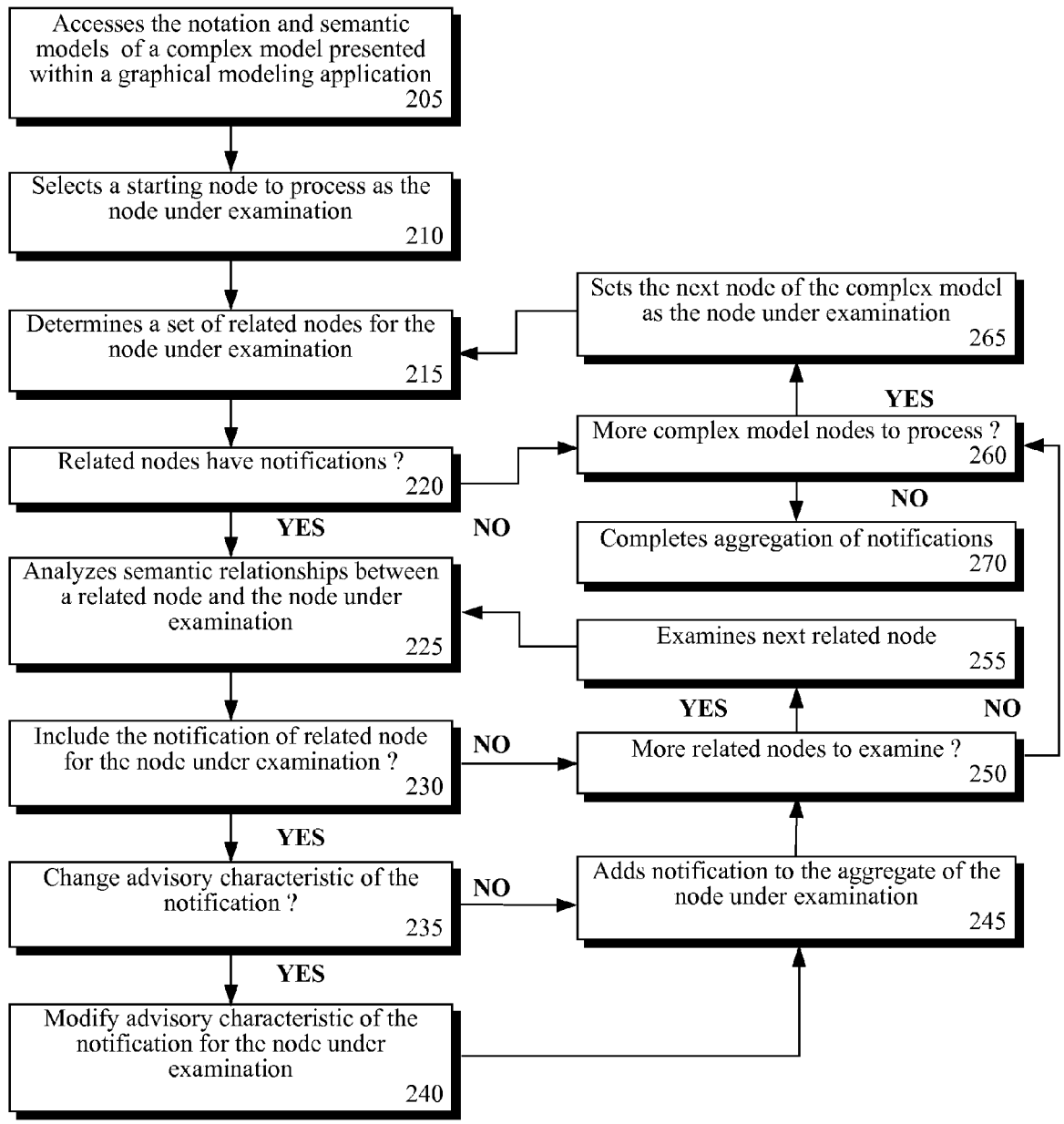
FIG. 2 is a flow chart of a method detailing the aggregation of notifications for the nodes of a complex model by an advisory manager in accordance with an embodiment of the inventive arrangements disclosed herein.

FIG. 2 is a flow chart of a method 200 detailing the aggregation of notifications for the nodes of a complex model by an advisory manager in accordance with an embodiment of the inventive arrangements disclosed herein. Method 200 can be performed in the context of system 100 or any other system in which a graphical modeling application segregates the data of a complex model into a notation model and a semantic model.

Method 200 can begin with step 205 where the advisory manager can access the notation and semantic models of the complex model presented within the graphical modeling application. In step 210, a starting node can be selected to be processes as the node under examination. A set of related nodes for the node under examination can be determined in step 215.

In step 220, it can be determined if the related nodes have notifications. When the related nodes do not have notifications for the node under examination, step 260 can execute where it can be determined if there are more nodes of the complex model to process.

When more nodes of the complex model require processing, the next node of the complex model can be set as the node under examination in step 265 and flow of method 200 can return to step 215 to continue processing. When no other nodes of the complex model require processing, step 270 can execute where the aggregation of notifications for the complex model is completed.

When it is determined in step 220 that the related nodes have notifications, the semantic relationships between a related node and the node under examination can be analyzed in step 225. In step 230, it can be determined if the notification for the related node should be included for the node under examination.

When the notification is not to be included with the node under examination, step 250 can execute where it can be determined if there are more related nodes to examine. When there are no other related nodes to be examined for the node under examination, flow of method 200 can proceed to step 260 to determine the continuation or termination of the aggregation process.

When there are more related nodes to examine, the next related node can be examined in step 255. From step 255, flow can return to step 225 to continue examination of the related nodes for the node under examination.

When it is determined in step 230 that the notification is not be included for the node under examination, step 235 can execute where it can be determined if a change to an advisory characteristic of the notification is necessary. For example, processing of an unsatisfied capability can determine that it should be changed to an optional capability for the node under examination.

When it is determined that a change in an advisory characteristic is required, the advisory characteristic of the notification can be modified for the node under examination in step 240. After execution of step 240, or when a change in an advisory characteristic is not required, step 245 can execute where the notification is added to the aggregate of notifications for the node under examination.

From step 245, flow of method 200 can proceed to step 250 to determine the existence of additional related nodes to process and the continuation of the notification aggregation process.

Figure 3:
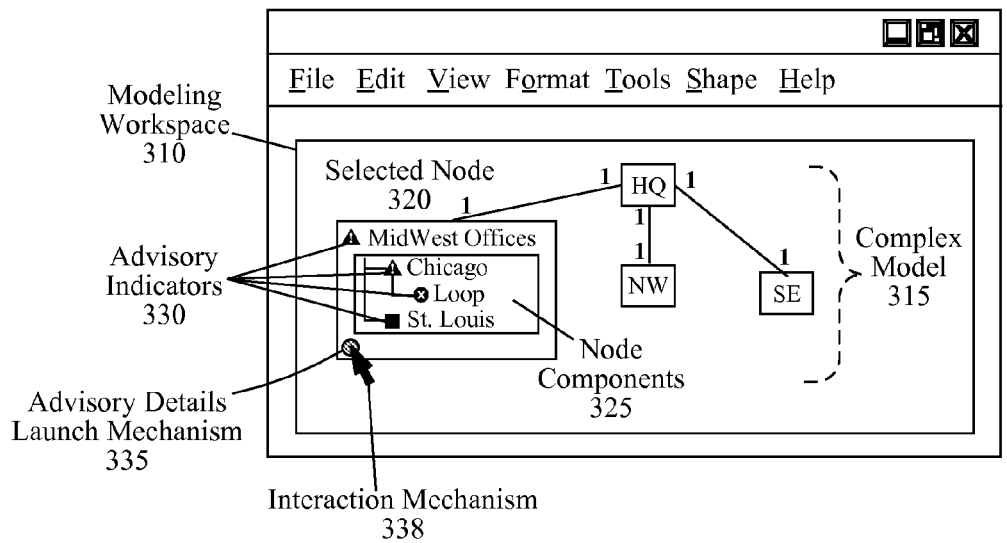
FIG. 3 is a collection of graphical user interfaces (GUIs) illustrating the presentation of notifications and potential resolutions within an graphical modeling application in accordance with an embodiment of the inventive arrangements disclosed herein.
Figure 3:
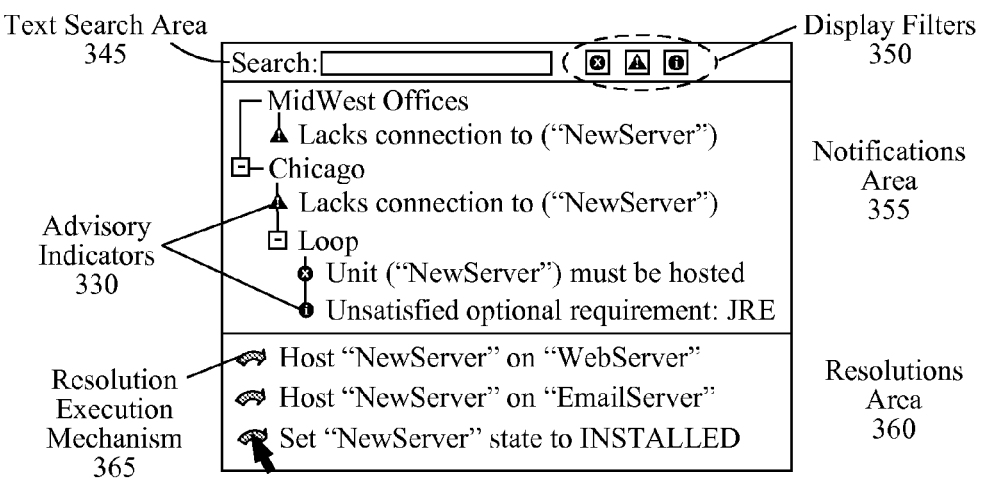

FIG. 3 is a collection 300 of graphical user interfaces (GUIs) 305 and 340 illustrating the presentation of notifications and potential resolutions within a graphical modeling application in accordance with embodiments of the inventive arrangements disclosed herein. The GUIs of collection 300 can be utilized within the context of system 100 and/or the execution of method 200.

It should be noted that the GUIs of collection 300 are for illustrative purposes only, and are not intended to represent comprehensive embodiments. As such, variation in representation and/or configurations can be made without deviating from the spirit of the present disclosure.

The graphical modeling application user interface 305 can allow a user to perform a variety of operations upon a complex model 315 presented within the modeling workspace 310. To highlight the interaction of an embodiment of the invention, a selected node 320 of the complex model 315 has been enlarged for discussion purposes.

As shown in this example, the selected node 320 is graphically represented as a rectangular container labeled "Mid-West Offices". The selected node 320 also has a "one-to-one" relationship with the node labeled "HQ". The node components 325 of the selected node 320 can also be displayed in its graphical representation within the ECLIPSE-based graphical modeling application user interface 305.

Additionally, the graphical representation of the selected node 320 and its node components 325 can include advisory indicators 330 and an advisory details launch mechanism 335. An advisory indicator 330 can be a graphic that visually signifies the existence of and/or the severity of the advisories for the selected node 320 and/or node components 325. The advisory indicators 330 can be related to the notification processing performed by the advisory manager.

The advisory details launch mechanism 335 can represent the means by which a user can access the advisory details display 340 for the selected node 320. The advisory details launch mechanism 335 can include a visual indicator within the graphical representation of the selected node 320.

As shown in this example, the advisory details launch mechanism 335 can be a button displayed in the selected node 320 that can be selected by the user with an interaction mechanism 338. Multiple advisory details launch mechanisms 335 can be made available within the graphical modeling application user interface 305, such as a selectable menu command in addition to a graphical button.

Selection of the advisory details launch mechanism 335 can present the advisory details display 340 for the selected node 320 within the graphical modeling application user interface 305. The advisory details display 340 can present the user with detailed information regarding the advisories associated with the selected node 320.

The advisory details display 340 can include a text search area 345, display filters 350, a notifications area 355, and a resolutions area 360. The notifications area 355 can display the aggregated notifications for the selected node 320. Since notifications for the selected node 320 are aggregated from related nodes in the complex model 315, the notifications area 355 can include pertinent notifications from node components 325.

The origin of the notifications can be preserved and displayed in the notifications area 355, as shown by the hierarchical tree structure presentation. Additionally, the advisory indicator 330 of each notification can also be displayed within the notifications area 355.

A user can utilize the text search area 345 to search for occurrences of a specific word or phrase within the notifications presented within the notifications area 355. Additional refinement of the notifications displayed within the notifications area 355 can be provided by the display filters 350. Selection of a specific display filter 350 can limit the contents of the notifications area 355 to only those notifications having the corresponding characteristic, such as advisory indicator 330.

The resolutions area 360 can present potential resolutions to the notifications of the notifications area 355, as determined by the advisory manager. A resolution execution mechanism 365 can be included for each presented resolution in the resolutions area 360.

Selection of a resolution execution mechanism 365 can initiate a set of programmatic commands executed by the advisory manager and/or the graphical modeling application to perform the resolution. The changes caused by the execution of a resolution can result in a change of information presented within the advisory details display 340.

For example, selection of the resolution "Set 'NewServer' state to INSTALLED" can trigger a series of operations that resolve all notifications for the selected node 320. Thus, the advisory details display 340 would change to inform the user that there are no advisories for the selected node 320.

It should be noted, however, that the execution of multiple resolutions may be necessary to resolve all notifications for the selected node 320. Further, situations may exist for which the advisory manager is unable to determine an automated solution. In such an event, the resolutions area 360 can include a manual resolution option (not shown).

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising hardware and software stored on at least one non-transitory storage medium, said system for managing advisories for complex model nodes comprising:
    a complex model configured to graphically represent a user-defined system as a plurality of nodes and relationships between the plurality of nodes, wherein the complex model comprises multiple data models that include a notation model and a semantic model, which are two distinct entities that are digitally encoded in a storage medium in a manner distinct from each other, wherein the notational model defines graphical characteristics of the complex model including graphical representations for nodes of the complex model including a shape of the nodes and edges connecting nodes to each other, wherein the semantic model stores capability and requirements parameters of nodes and stores semantic relationships between related nodes used by the advisory manager to determine if existing notifications of related nodes are to be aggregated to or not based on values of the capability and requirements parameters and based on content of the existing notifications;
    a graphical modeling application stored on at least one non-transitory storage medium configured to support execution of a plurality of operations upon the complex model, wherein said graphical modeling application stores data defining graphical characteristics of the complex model in the notation model and stores data defining semantic characteristics of the complex model in the semantic model, wherein the notation model and the semantic model are stored in the storage medium as separate data entities;
    the graphical modeling application further configured to generate notifications, wherein the notifications indicate problems or potential problems with a current state of the complex model; and
    the advisory manager configured to aggregate notifications from different ones of the nodes that are related to each other based on the semantic model information and potential resolutions for the plurality of nodes of the complex model, wherein said aggregated notifications and potential resolutions are visually presented within the graphical modeling application.

2. The system of claim 1, wherein the graphical modeling application and advisory manager utilize at least one of an ECLIPSE Modeling Framework (EMF) and a Graphical Editing Framework (GEF).

3. The system of claim 1, wherein the advisory manager further comprises:
    a notification handler configured to correlate and analyze the notation model and the semantic model associated with the complex model to identify and aggregate the notifications for each node of the complex model, wherein an aggregate of notifications for a node encompasses notifications for semantically-related nodes;
    a resolution handler configured to determine, for each node, the potential resolutions to the aggregate of notifications identified by the notification handler, for that node;
    a plurality of processing rules defining operational guidelines for the at least one of the notification handler and the resolution handler; and
    an interface handler configured to manage interactions between the graphical modeling application, the notification handler, and the resolution handler.

4. The system of claim 3, wherein the interactions managed by the interface handler comprise at least one of a presentation of notifications, a presentation of potential resolutions, and an execution of a potential resolution.

5. The system of claim 4, wherein the execution of the potential resolution modifies at least one of the notation model and the semantic model associated with the complex model.

6. The system of claim 3, wherein the plurality of processing rules comprises a set of at least one user-configurable parameter.

7. The system of claim 1, wherein a notification for a node comprises at least one of a warning, an unsatisfied requirement, an optional requirement, an unsatisfied capability, an optional capability, and an incompatibility notice.

8. The system of claim 1, wherein the advisory manager IS an integrated component of the graphical modeling application.

9. A method for managing advisories for complex model nodes comprising:
- determining at least one related node for a node of a complex model, wherein the complex model comprises multiple data models that include a notation model and a semantic model, which are two distinct entities that are digitally encoded in a storage medium in a manner distinct from each other, wherein the notational model defines graphical characteristics of the complex model including graphical representations for nodes of the complex model including a shape of the nodes and edges connecting nodes to each other, wherein the semantic model stores capability and requirements parameters of nodes and stores semantic relationships between related nodes used by an advisory manager to determine if existing notifications of related nodes are to be aggregated to or not based on values of the capability and requirements parameters and based on content of the existing notifications, the complex model is presented within a graphical modeling application;
- generating, by the graphical modeling application, notifications for the node and the at least one related node, wherein the notifications indicate problems or potential problems with a current state of the complex model;
- creating an aggregate of notifications for the node from notifications of the at least one determined related node, wherein decisions of whether to aggregate ones of the notifications between related nodes is based at least in part on the semantic relationships stored in the semantic model and based on the determinations of the advisory manager; and
- in response to a user-selected command, presenting said aggregate of notifications for the node in a distinct viewing area within a graphical user interface of the graphical modeling application, wherein the displaying of nodes utilizes the information from the graphical characteristics stored in the notation model.

10. The method of claim 9, wherein said notifications comprise at least one of an unsatisfied requirement, an optional requirement, an unsatisfied capability, an optional capability, and an incompatibility notice.

11. The method of claim 9, wherein the aggregating of the notifications further comprises:
- locating the node within the notation model and the semantic model;
- correlating a relationship of the node within the notation model with corresponding semantic data of the semantic model for the at least one related node;
- identifying an existence of notifications associated with the at least one related node; and
- determining an inclusion of a notification from the at least one related node within the aggregate of notifications for the node.

12. The method of claim 11, wherein determining the inclusion of the notification further comprises:
- assessing an advisory type of the notification for the at least one related node;
- analyzing the semantic data of the relationship between the node and the at least one related node with respect to the assessed advisory type; and
- based on said analysis, adjusting the advisory type of the notification within the aggregate of notifications.

13. The method of claim 12, wherein the analysis of the semantic data utilizes a plurality of predetermined processing rules.

14. The method of claim 9, further comprising:
- determining at least one potential resolution for the aggregate of notifications for the node; and
- presenting the at least one potential resolution within the distinct viewing area coupled with the aggregate of notifications, wherein said presented at least one potential resolution is coupled with a user-selectable initiation mechanism to execute the at least one potential resolution.

15. The method of claim 14, wherein execution of a potential resolution modifies at least one of the notation model and the semantic model associated with the complex model.

16. A computer program product for managing advisories for complex model nodes comprising a non-transitory computer readable storage medium having computer usable program code embodied therewith, the computer usable program code comprising:
- computer usable program code configured to determine at least one related node for a node of a complex model, wherein a relationship to the at least one related node is captured in a notation model and a semantic model associated with the complex model, and, wherein the complex model is presented within a graphical modeling application, wherein the complex model includes the notation model and the semantic model, which are two distinct entities that are digitally encoded in a storage medium in a manner distinct from each other, wherein the notational model defines graphical characteristics of the complex model including graphical representations for nodes of the complex model including a shape of the nodes and edges connecting nodes to each other, wherein the semantic model stores capability and requirements parameters of nodes and stores semantic relationships between related nodes used by an advisory manager to determine if existing notifications of related nodes are to be aggregated to or not based on values of the capability and requirements parameters and based on content of the existing notifications;
- computer usable program code configured to create an aggregate of notifications for the node from notifications of the at least one determined related node based on the semantic model information, wherein the notifications indicate problems or potential problems with a current state of the complex model, and wherein said notifications are generated by the graphical modeling application, wherein the graphical modeling application uses the graphical characteristics of the notational model to present the complex model within a graphical user interface; and
- computer usable program code configured to present said aggregate of notifications for the node in a distinct viewing area within a graphical user interface of the graphical modeling application in response to a user-selected command.

17. The computer program product of claim 16, wherein the aggregating of the notifications further comprises:
- computer usable program code configured to locate the node within the notation model and the semantic model;
- computer usable program code configured to correlate a relationship of the node within the notation model with corresponding semantic data of the semantic model for the at least one related node;
- computer usable program code configured to identify an existence of notifications associated with the at least one related node; and computer usable program code configured to determine an inclusion of a notification from the at least one related node within the aggregate of notifications for the node.

18. The computer program product of claim 17, wherein determining the inclusion of the notification further comprises:
- computer usable program code configured to assess an advisory type of the notification for the at least one related node;
- computer usable program code configured to analyze the semantic data of the relationship between the node and the at least one related node with respect to the assessed advisory type; and
- computer usable program code configured to adjust the advisory type of the notification within the aggregate of notifications based on said analysis.

19. The computer program product of claim 16, further comprising:
- computer usable program code configured to determine at least one potential resolution for the aggregate of notifications for the node; and
- computer usable program code configured to present the at least one potential resolution within the distinct viewing area coupled with the aggregate of notifications.

20. The computer program product of claim 16, wherein the computer program product utilizes at least one of an ECLIPSE Modeling Framework (EMF) and a Graphical Editing Framework (GEF).

* * * * *